United States Patent
Tsutsui

(10) Patent No.: US 11,196,479 B2
(45) Date of Patent: Dec. 7, 2021

(54) SYSTEM, MANAGEMENT DEVICE, AND AIRCRAFT

(71) Applicant: HAPSMobile Inc., Tokyo (JP)

(72) Inventor: Tatsushi Tsutsui, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/204,889

(22) Filed: Mar. 17, 2021

(65) Prior Publication Data

US 2021/0211187 A1 Jul. 8, 2021

Related U.S. Application Data

(63) Continuation of application No. PCT/JP2019/029959, filed on Jul. 31, 2019.

(30) Foreign Application Priority Data

Sep. 21, 2018 (JP) .............................. JP2018-177677

(51) Int. Cl.
*H04B 7/185* (2006.01)
*G05D 1/10* (2006.01)
(Continued)

(52) U.S. Cl.
CPC ......... *H04B 7/18506* (2013.01); *B64C 19/02* (2013.01); *G05D 1/0022* (2013.01);
(Continued)

(58) Field of Classification Search
CPC ............. H04B 7/18506; G05D 1/1062; G05D 1/0022; G05D 1/104; B64C 19/02; G08G 5/0013
See application file for complete search history.

(56) References Cited

U.S. PATENT DOCUMENTS 6,285,878 B1 * 9/2001 Lai .................. H04W 84/02
455/431
9,083,425 B1 7/2015 Frolov
(Continued)

FOREIGN PATENT DOCUMENTS

JP 2002211496 A 7/2002
JP 2008003675 A 1/2008
(Continued)

OTHER PUBLICATIONS

Decision to Grant a Patent issued for counterpart Japanese Application No. 2018-177677, issued by the Japanese Patent Office dated Jan. 7, 2020 (drafted on Dec. 19, 2019).
(Continued)

*Primary Examiner* — Hussein Elchanti

(57) ABSTRACT

A system includes a plurality of aircrafts, each of which has an antenna for forming a communication area on the ground to provide a radio communication service to a user terminal in the communication area, and a management device for managing the plurality of aircrafts. The management device includes a signal transmitting unit that transmits a remote operation signal to an aircraft selected as the remote operation target from the plurality of aircrafts. Each of the plurality of aircrafts includes a remote operation flying control unit that, when an aircraft is selected as the remote operation target, causes the aircraft to fly based on the remote operation signal received from the management device, and a tuned flying control unit that, when the aircraft is not selected as the remote operation target, causes the aircraft to fly in tune with other aircraft selected as the remote operation target.

18 Claims, 12 Drawing Sheets

(51) Int. Cl.
*B64C 19/02* (2006.01)
*G05D 1/00* (2006.01)
*G08G 5/00* (2006.01)

(52) U.S. Cl.
CPC ........... *G05D 1/104* (2013.01); *G05D 1/1062* (2019.05); *G08G 5/0013* (2013.01)

(56) References Cited

U.S. PATENT DOCUMENTS

| | | | | |
|---|---|---|---|---|
| 2004/0102191 | A1* | 5/2004 | Pewitt | H04B 7/18504 455/431 |
| 2005/0090201 | A1* | 4/2005 | Lengies | H04B 7/18506 455/41.2 |
| 2013/0070677 | A1* | 3/2013 | Chang | H04B 7/18517 370/328 |
| 2014/0195150 | A1* | 7/2014 | Rios | G01C 21/00 701/469 |
| 2014/0241239 | A1* | 8/2014 | Chang | H04B 7/18504 370/316 |
| 2015/0097079 | A1* | 4/2015 | Frolov | F03D 9/25 244/54 |
| 2016/0046387 | A1* | 2/2016 | Frolov | B64B 1/00 244/59 |
| 2016/0050012 | A1* | 2/2016 | Frolov | H04B 7/18506 455/431 |
| 2018/0069619 | A1 | 3/2018 | Behroozi | |
| 2019/0180633 | A1 | 6/2019 | Yoshizawa | |
| 2020/0279195 | A1 | 9/2020 | Kobori | |

FOREIGN PATENT DOCUMENTS

| | | |
|---|---|---|
| JP | 2015191254 A | 11/2015 |
| JP | 2017195493 A | 10/2017 |
| JP | 6341352 B1 | 6/2018 |
| KR | 20160074897 A | 6/2016 |
| WO | 2018061502 A1 | 4/2018 |

OTHER PUBLICATIONS (ISA/237) Written Opinion of the International Search Authority for International Patent Application No. PCT/JP2019/029959, by the Japan Patent Office dated Oct. 15, 2019.

Extended European Search Report for counterpart European Application No. 19863010.5, issued by the European Patent Office dated Sep. 30, 2021.

* cited by examiner

SYSTEM, MANAGEMENT DEVICE, AND AIRCRAFT

The contents of the following Japanese and PCT applications are incorporated herein by reference:
NO. 2018-177677 filed in JP on Sep. 21, 2018 and
NO. PCT/JP2019/029959 filed in WO on Jul. 31, 2019.

BACKGROUND

1. Technical Field

The present invention relates to a system, a management device, and an aircraft.

2. Related Art

There has been known an aircraft which has an antenna and flies in the stratosphere in order to provide a stratosphere platform (for example, see Patent Literature 1). In addition, there is known a technology of forming a communication network between unmanned aerial vehicles (for example, see Patent Literature 2).

CITATION LIST

Patent Literature

Patent Literature 1: Japanese Patent Application Publication No. 2002-211496
Patent Literature 2: Specification of U.S. Pat. No. 9,083,425

Means for Solving the Problem

It is desirable to provide a technology that can support the operation of a plurality of aircrafts.

DESCRIPTION OF EXEMPLARY EMBODIMENTS

Hereinafter, the invention will be described through embodiments of the invention, but the following embodiments do not limit the invention according to claims. In addition, not all of the combinations of features described in the embodiments are essential to the solving means of the invention.

Figure 1:
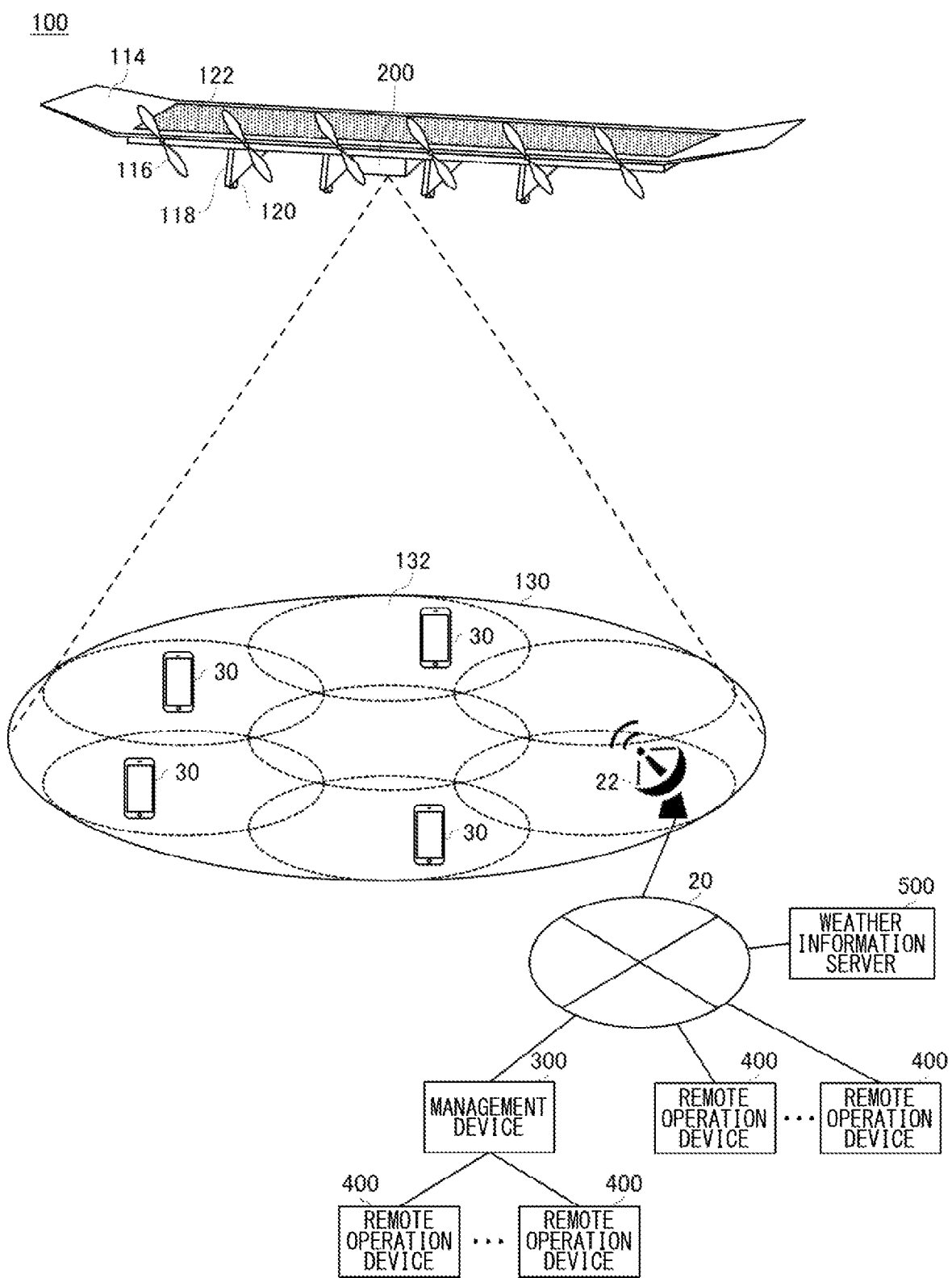
FIG. 1 schematically illustrates an example of an aircraft 100.

FIG. 1 schematically illustrates an example of an aircraft 100. The aircraft 100 according to this embodiment includes a main wing part 114, a propeller 116, a skid 118, a wheel 120, a solar cell panel 122, and a control device 200. The control device 200 controls the flying of the aircraft 100.

The aircraft 100 includes a battery (not illustrated). The battery stores power generated by the solar cell panel 122. The aircraft 100 can fly by rotating the propeller 116 using the power stored in the battery.

The aircraft 100 has an antenna which forms a communication area 130 on the ground and is used for providing a radio communication service to a user terminal 30 in the communication area 130. The communication area 130 may be configured by a single cell, or may be configured by a plurality of cells 132. The aircraft 100 may include a feeder link antenna and a service link antenna as the antenna. The aircraft 100 may communicate with a gateway 22 on the ground through the feeder link antenna, and communicate with the user terminal 30 on the ground through the service link antenna.

The aircraft 100 may include a communication device for directly communicating with other aircraft 100. For example, the aircraft 100 may further have an antenna (not illustrated) for directly communicating with the other aircraft 100. The aircraft 100 may form a C2 link with the other aircraft 100 using the antenna. In addition, the aircraft 100 may include an optical communication device for executing optical communication with the other aircraft 100.

The aircraft 100 includes a camera (not illustrated). The camera may image the surroundings of the aircraft 100. The aircraft 100 may transmit the image captured by the camera to the ground or the other aircraft 100.

Any terminal may be used for the user terminal 30 as long as the terminal is a communication terminal that can communicate with the aircraft 100. For example, the user terminal 30 is a portable phone such as a smart phone. The user terminal 30 may be a tablet terminal, a PC (Personal Computer), and the like.

The aircraft 100 relays communication between, for example, the user terminal 30 and a network 20 on the ground to provide the radio communication service to the user terminal 30. The network 20 may include a core network which is provided by a communication service provider. In addition, the network 20 may include the Internet.

The aircraft 100 may communicate with the network 20 via a gateway 22 in the communication area 130 among the gateways 22 on the ground. In addition, for example, the aircraft 100 may communicate with the network 20 via a communication satellite (not illustrated).

The aircraft 100 transmits, for example, data received from the user terminal 30 in the communication area 130 to the network 20. In addition, for example, when receiving the data addressed to the user terminal 30 in the communication area 130 via the network 20, the aircraft 100 transmits the data to the user terminal 30.

The aircraft 100 is managed by a management device 300. The management device 300 may control the aircraft 100 via the network 20 and the gateway 22. In addition, the management device 300 may control the aircraft 100 via a communication satellite (not illustrated).

The management device 300 is communicatively connected to a remote operation device 400 for remotely operating the aircraft 100. The management device 300 and the remote operation device 400 may be directly connected, or may be connected via the network 20. The management device 300 may transmit a remote operation signal, which has been received from the remote operation device 400, to the aircraft 100.

The aircraft 100 has a function of controlling its flight according to the remote operation signal. The aircraft 100 may receive the remote operation signal, which has been transmitted by the remote operation device 400, via the management device 300. The aircraft 100 may receive the remote operation signal, which has been transmitted by the remote operation device 400, without going through the management device 300.

For example, the management device 300 receives a captured image from the aircraft 100 in association with a remote operation target aircraft 100 and the remote operation device 400 for remotely operating the aircraft 100, transmits the captured image to the remote operation device 400, receives the remote operation signal from the remote operation device 400, and transmits the remote operation signal to the aircraft 100. Thereby, the remote operation of the aircraft 100 by the remote operation device 400 can be achieved.

In addition, the aircraft 100 has a function of flying in tune with the other aircraft 100. The flying in tune with the other aircraft 100 includes flying while following the other aircraft 100. In addition, the flying in tune with the other aircraft 100 includes flying in the same pattern as the flying pattern of the other aircraft 100 or in a pattern corresponding to the flying pattern of the other aircraft 100. For example, the aircraft 100 flies in the same flying pattern as the other aircraft 100 or a corresponding flying pattern in a flying area different from the other aircraft 100. In addition, for example, in a case where the other aircraft 100 is circling in the sky of a covering target area on the ground, the aircraft 100 circles the sky of its covering target area in the same flying pattern as the other aircraft 100. The circling on the sky of the target area may be described as a fixed point flying.

The control device 200 may control a plurality of aircrafts 100 based on a weather condition of the flying area where the plurality of aircrafts 100 are flying. The control device 200 may receive weather information indicating the weather condition of each area from a weather information server 500 which manages and provides the weather information of the sky of each area.

Figure 2:
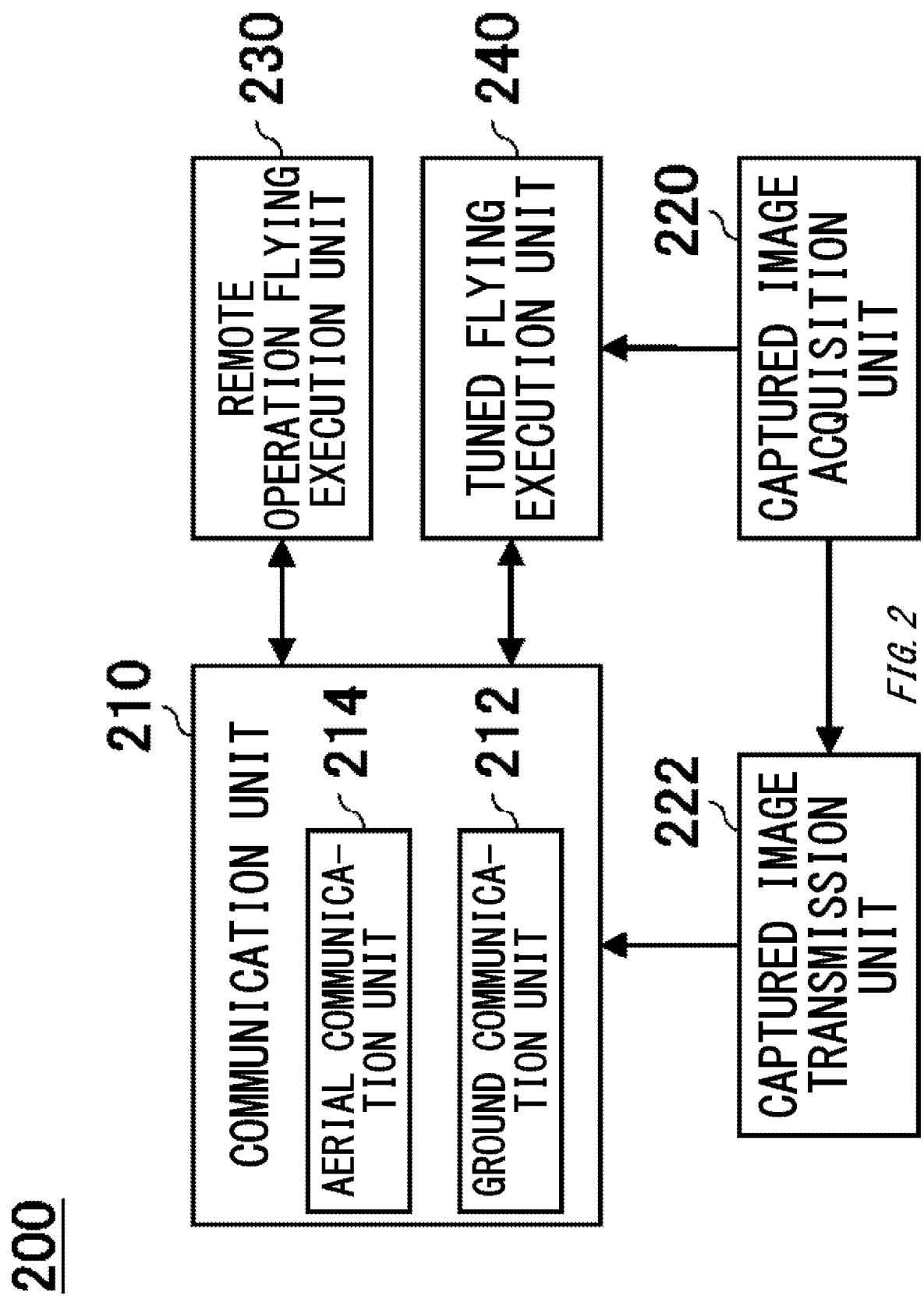
FIG. 2 schematically illustrates an example of the functional configuration of a control device 200.

FIG. 2 schematically illustrates an example of the functional configuration of the control device 200. The control device 200 includes a communication unit 210, a captured image acquisition unit 220, a captured image transmission unit 222, a remote operation flying execution unit 230, and a tuned flying execution unit 240.

The communication unit 210 includes a ground communication unit 212 and an aerial communication unit 214. The ground communication unit 212 communicates with a device on the ground. The ground communication unit 212 may communicate with a device on the ground using a feeder link antenna and a service link antenna. The ground communication unit 212 communicates, for example, with the user terminal 30 in the communication area 130. In addition, the ground communication unit 212 communicates, for example, with a device connected to the network 20 via the gateway 22 in the communication area 130.

The aerial communication unit 214 communicates with a device in the sky. The aerial communication unit 214 communicates, for example, with the other aircraft 100 on the sky via a C2 link. In addition, the aerial communication unit 214 communicates, for example, with the other aircraft 100 in the sky via an optical communication.

The captured image acquisition unit 220 acquires a captured image taken by its camera. The captured image transmission unit 222 transmits the captured image taken by the captured image acquisition unit 220 via the communication unit 210. The captured image transmission unit 222 transmits, for example, the captured image to a device on the ground via the ground communication unit 212. In addition, the captured image transmission unit 222 transmits, for example, the captured image to the other aircraft 100 in the sky via the aerial communication unit 214.

When the aircraft is selected as a remote operation target, the remote operation flying execution unit 230 causes the aircraft to fly according to the remote operation signal which is received by the ground communication unit 212 from the management device 300 or the remote operation device 400.

The tuned flying execution unit 240 causes the aircraft to fly in tune with the other aircraft 100. The tuned flying execution unit 240 causes, for example, the aircraft to fly in tune with the other aircraft 100 which is specified by the management device 300. In addition, for example, in a case where the aircraft is not selected as the remote operation target, the tuned flying execution unit 240 causes the aircraft to fly in tune with the other aircraft 100 which is selected as the remote operation target. For example, in a case where the own aircraft flies following the other aircraft 100, the tuned flying execution unit 240 recognizes the other aircraft 100 based on the captured image acquired by the captured image acquisition unit 220, and controls the aircraft to fly following the recognized other aircraft 100.

Figure 3:
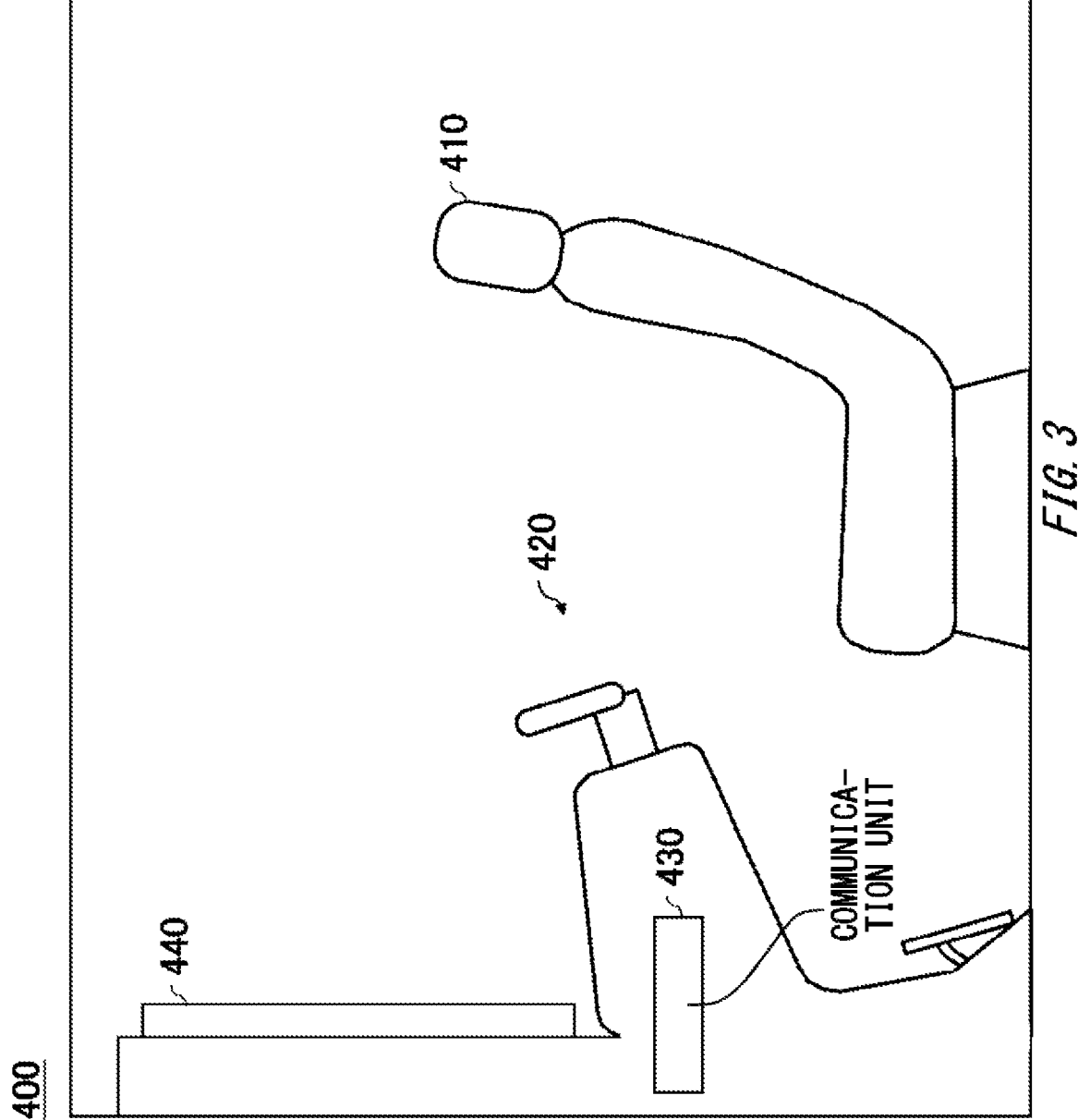
FIG. 3 schematically illustrates an example of a remote operation device 400.

FIG. 3 schematically illustrates an example of the remote operation device 400. The remote operation device 400 includes a cockpit 410, an operation unit 420, a communication unit 430, and a display unit 440. The remote operation device 400 receives an operation on the operation unit 420 performed by a remote operator of the cockpit 410. The operation unit 420 includes a control stick, operation buttons for accepting various operations, foot pedals, and the like.

The communication unit 430 communicates with the management device 300. The communication unit 430 may directly communicate with the management device 300, or may communicate via the network 20.

In addition, the communication unit 430 communicates with the aircraft 100. The communication unit 430 may communicate with the aircraft 100 via the management device 300. The communication unit 430 may communicate with the aircraft 100 without going through the management device 300. For example, in a case where the management device 300 has established the communication connection between the remote operation target aircraft 100 and the remote operation device 400, the communication unit 430 may communicate with the aircraft 100 via the network 20 and the gateway 22.

The communication unit 430 may receive a captured image taken by the camera of the aircraft 100. The communication unit 430 may receive the captured image from the management device 300, or may receive the captured image from the aircraft 100.

The display unit 440 is, for example, a display. The display unit 440 displays various information necessary for the remote operation of the aircraft 100. The display unit 440 may display, for example, the captured image received by the communication unit 430. Further, the display unit 440 may be a projector and a screen instead of a display.

The communication unit 430 transmits the remote operation signal corresponding to an operation content, which has been performed by the remote operator on the operation unit 420, to the aircraft 100. The communication unit 430 may transmit the remote operation signal to the aircraft 100 via the management device 300, or may transmit the remote operation signal to the aircraft 100 without going through the management device 300.

Figure 4:
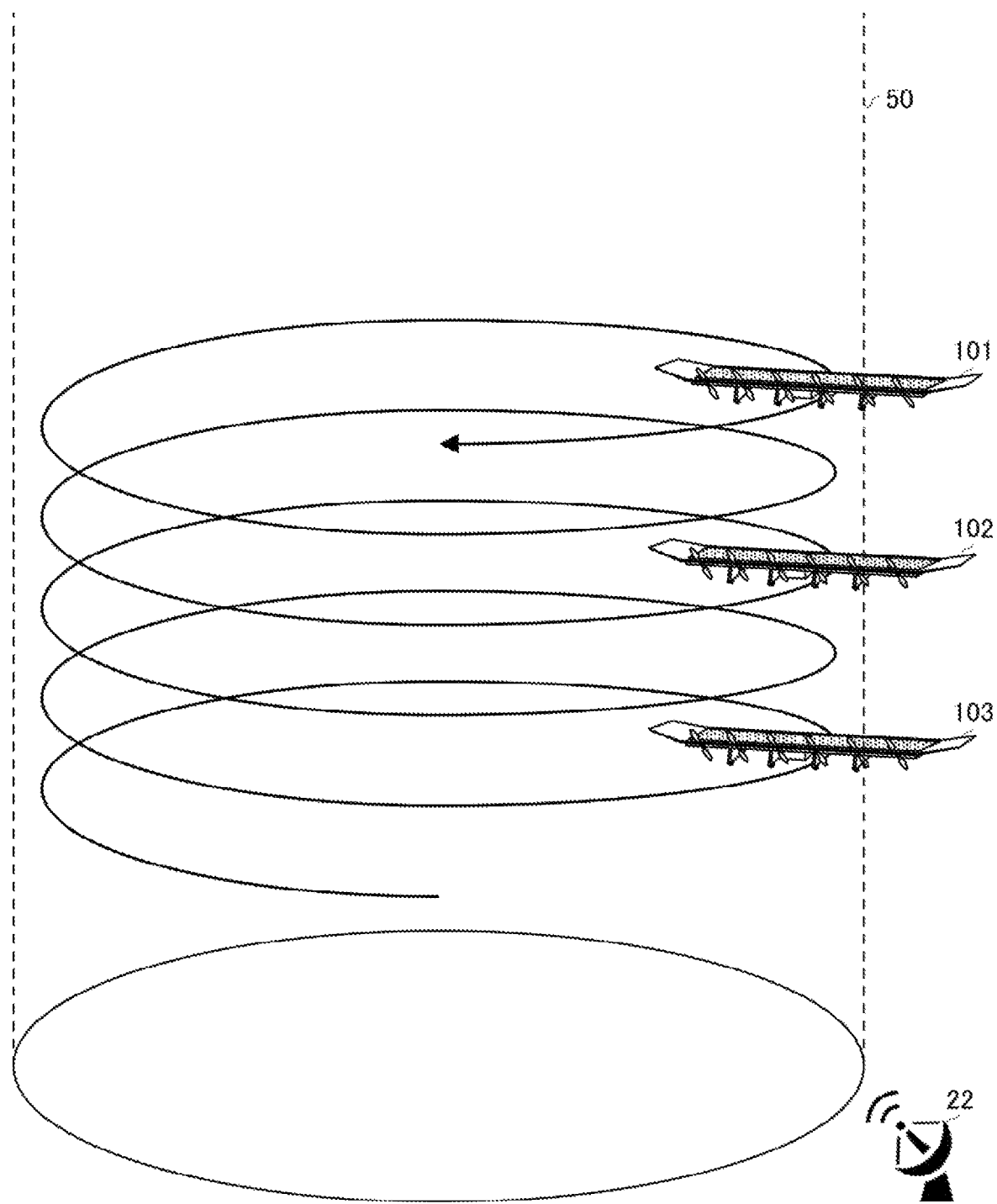
FIG. 4 schematically illustrates an example of formation flying of a plurality of aircrafts 100.

FIG. 4 schematically illustrates an example of the formation flying when the plurality of aircrafts 100 takeoff. The aircraft 100 rises to the intended altitude while circling within the range of a cylinder-like takeoff and landing region 50. The aircraft 100 rises, for example, to the stratosphere while circling within the range of the takeoff and landing region 50.

In FIG. 4, an aircraft group consisting of an aircraft 101, an aircraft 102, and an aircraft 103 is illustrated as an example of the aircraft group which performs the formation flying. A case where the aircraft 101 flies according to the remote operation signal and the aircraft 102 and the aircraft 103 are flying in tune will be exemplified. The aircraft 100 which flies according to the remote operation signal may be referred to as a parent aircraft, and the aircraft 100 which flies in tune may be referred to as a child aircraft.

In the example illustrated in FIG. 4, the aircraft 101 rises while circling according to the remote operation signal received from the management device 300 or the remote operation device 400 via the gateway 22.

The aircraft 102 departs when a predetermined time elapses after the aircraft 101 takes off, and rises while circling in the same flying pattern as the aircraft 101. The aircraft 102 receives, for example, the remote operation signal used by the aircraft 101 from the aircraft 101, and flies in the same flying pattern as the aircraft 101 based on the remote operation signal. The aircraft 102 may receive path information indicating a three-dimensional flying path in which the aircraft 101 flies, from the aircraft 101, and fly in the same flying pattern as the aircraft 101 based on the path information.

The aircraft 103 departs, for example, when a predetermined time elapses after the aircraft 102 takes off, and rises while circling in the same flying pattern as the aircraft 101 or the aircraft 102. The aircraft 103 receives the remote operation signal from the aircraft 101 or the aircraft 102, and flies in the same flying pattern as the aircraft 101 based on the remote operation signal. The aircraft 103 may receive the path information from the aircraft 101 or the aircraft 102, and fly in the same flying pattern as the aircraft 101 based on the path information.

In FIG. 4, an example in which the aircraft 101, the aircraft 102, and the aircraft 103 fly in series in the same takeoff and landing region 50, but the invention is not limited to this, these bodies may fly in the takeoff and landing regions 50 different from each other. In this case, the aircraft 101, the aircraft 102, and the aircraft 103 may depart and fly at the same time. For example, the aircraft 101 flies according to the remote operation signal, and the aircraft 102 and the aircraft 103 fly based on the remote operation signal or the path information received from the aircraft 101.

Conventionally, at least three remote operators have been required to take off three aircrafts 100 and fly them up to the target altitude such as the stratosphere. In contrast, according to the aircraft 100 of this embodiment, one remote operator can fly three aircrafts 100 to the target altitude, and the number of required remote operators can be reduced.

Figure 5:
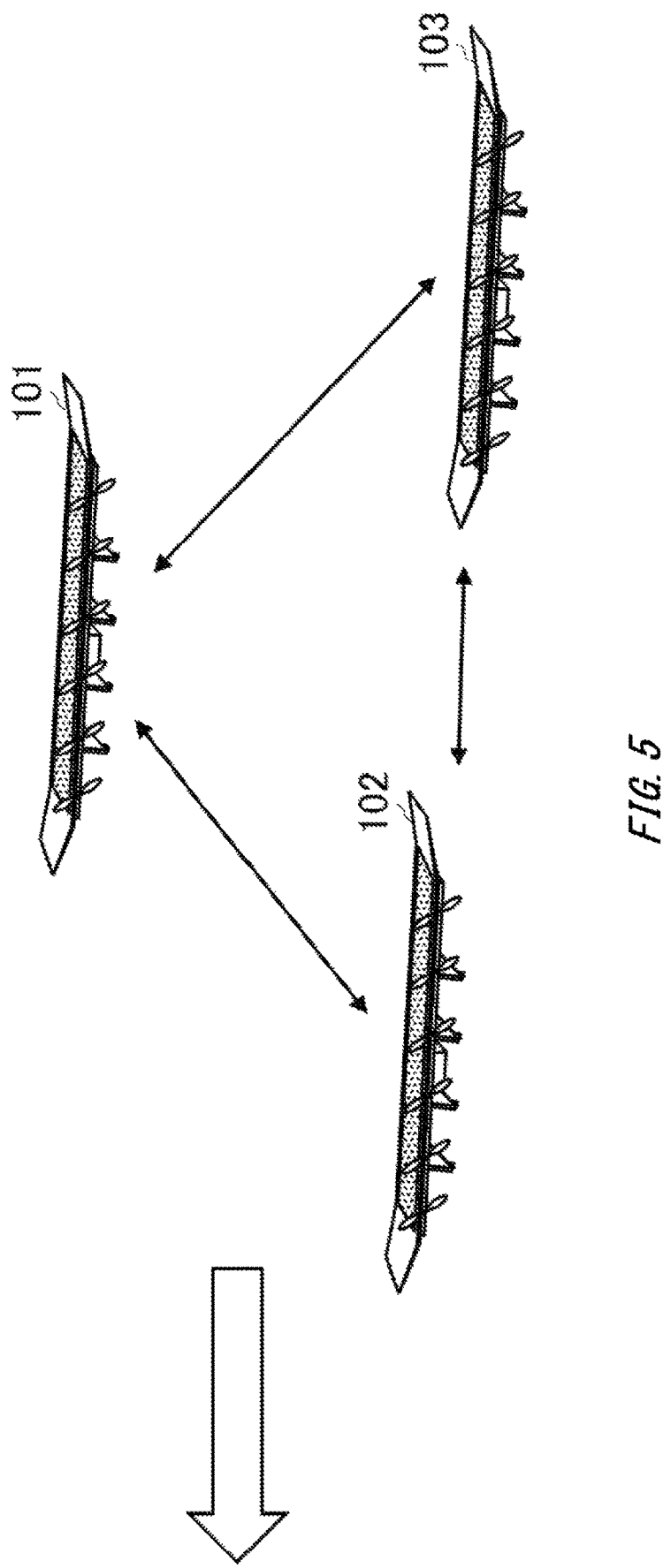
FIG. 5 schematically illustrates an example of formation flying of a plurality of aircrafts 100.

FIG. 5 schematically illustrates an example of the formation flying of the plurality of aircrafts 100 to a destination. The destination is, for example, the sky of a covering target area on the ground covered by the plurality of aircrafts 100.

The management device 300 groups, for example, the plurality of aircrafts 100 according to an instruction by the operator of the management device 300. In addition, the management device 300 groups, for example, the plurality of aircrafts 100 based on destination information indicating the destination of each of the plurality of aircrafts 100. The management device 300 groups the plurality of aircrafts 100 having the same area as a destination in one group.

The management device 300 selects the aircraft 100 of the remote operation target for each of the plurality of aircraft groups. FIG. 5 illustrates a case where the aircraft 101 is selected as the remote operation target for a flying group including the aircraft 101, the aircraft 102, and the aircraft 103. The aircraft 101 flies to a destination according to the remote operation signal received from the management device 300 or the remote operation device 400.

The aircraft 102 and the aircraft 103 fly in tune with the aircraft 101. For example, the aircraft 102 and the aircraft 103 fly following the aircraft 101. The aircraft 102 and the aircraft 103 may fly in tune with the aircraft 101 while communicating with the aircraft 101.

FIG. 5 illustrates a case where the aircraft 101, the aircraft 102, and the aircraft 103 directly communicate to each other. The aircraft 101, the aircraft 102, and the aircraft 103 may form a ring network. In a case where four or more aircrafts 100 form a network, a mesh network may be formed.

Further, the aircraft 101, the aircraft 102, and the aircraft 103 may communicate to each other via the ground. For example, the aircraft 101, the aircraft 102, and the aircraft 103 communicate via the gateway 22 in each communication area 130 and the network 20, or communicate via the management device 300. In addition, the aircraft 101, the aircraft 102, and the aircraft 103 may communicate to each other via a communication satellite.

Figure 6:
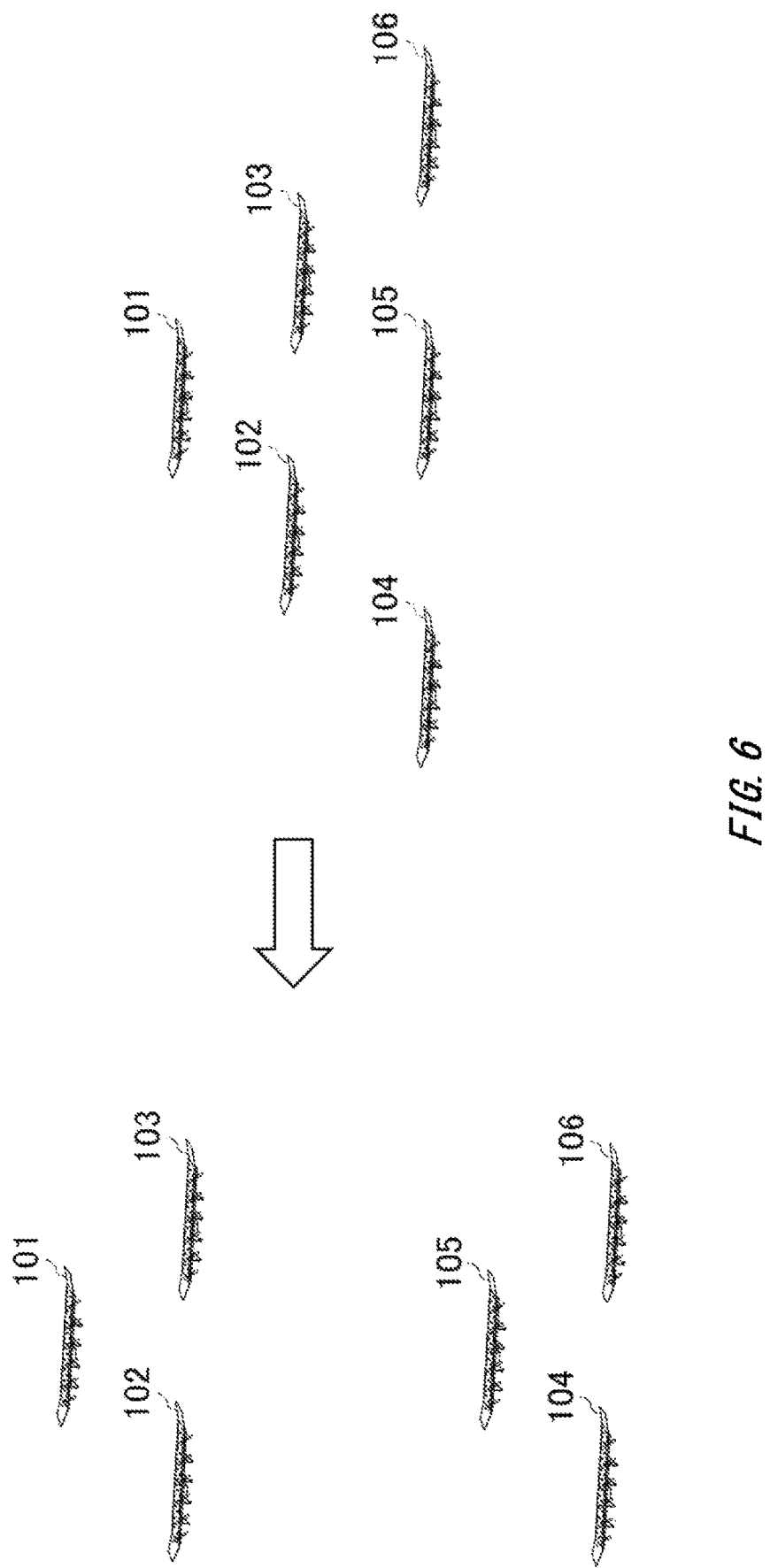
FIG. 6 schematically illustrates an example of formation flying of a plurality of aircrafts 100.

FIG. 6 schematically illustrates another example of the formation flying of the plurality of aircrafts 100 to a destination. Here, the description will be given about a case where one aircraft group is divided in the middle of flying.

The management device 300 selects, for example, a plurality of aircraft groups, which have a partially overlapping path to the destination, based on the destination information indicating the destination of each of the plurality of aircraft groups. Then, the management device 300 selects one aircraft of the remote operation target from the plurality of aircrafts included in the plurality of selected aircraft groups for the overlapping section in the path to the destination, and selects one aircraft of the remote operation target for each of the plurality of aircraft groups for the non-overlapping section.

FIG. 6 illustrates a case in which, for a first aircraft group including the aircraft 101, the aircraft 102, and the aircraft 103 and a second aircraft group including an aircraft 104, an aircraft 105, and an aircraft 106, the aircraft 101 is selected as the remote operation target for the overlapping section in the path to the destination, and the aircraft 101 and the aircraft 104 are selected as the remote operation target for the non-overlapping section.

In the overlapping section, the aircraft 101 flies according to the remote operation signal received from the management device 300 or the remote operation device 400, and the aircraft 102, the aircraft 103, the aircraft 104, the aircraft 105, and the aircraft 106 fly in tune with the aircraft 101. Then, these are divided into a first flying group and a second flying group at a branch point. In the first flying group, the aircraft 101 flies according to the remote operation signal transmitted by the remote operation device 400, and the aircraft 102 and the aircraft 103 fly in tune with the aircraft 101. In the second flying group, the aircraft 104 flies according to the remote operation signal transmitted by the remote operation device 400 different from the first flying group, and the aircraft 105 and the aircraft 106 fly in tune with the aircraft 104.

Thereby, one remote operator may be assigned to the six aircrafts 100 for the overlapping section. Therefore, it is possible to reduce the number of required remote operators compared to the case where the first flying group and the second flying group fly separately from the beginning.

Figure 7:
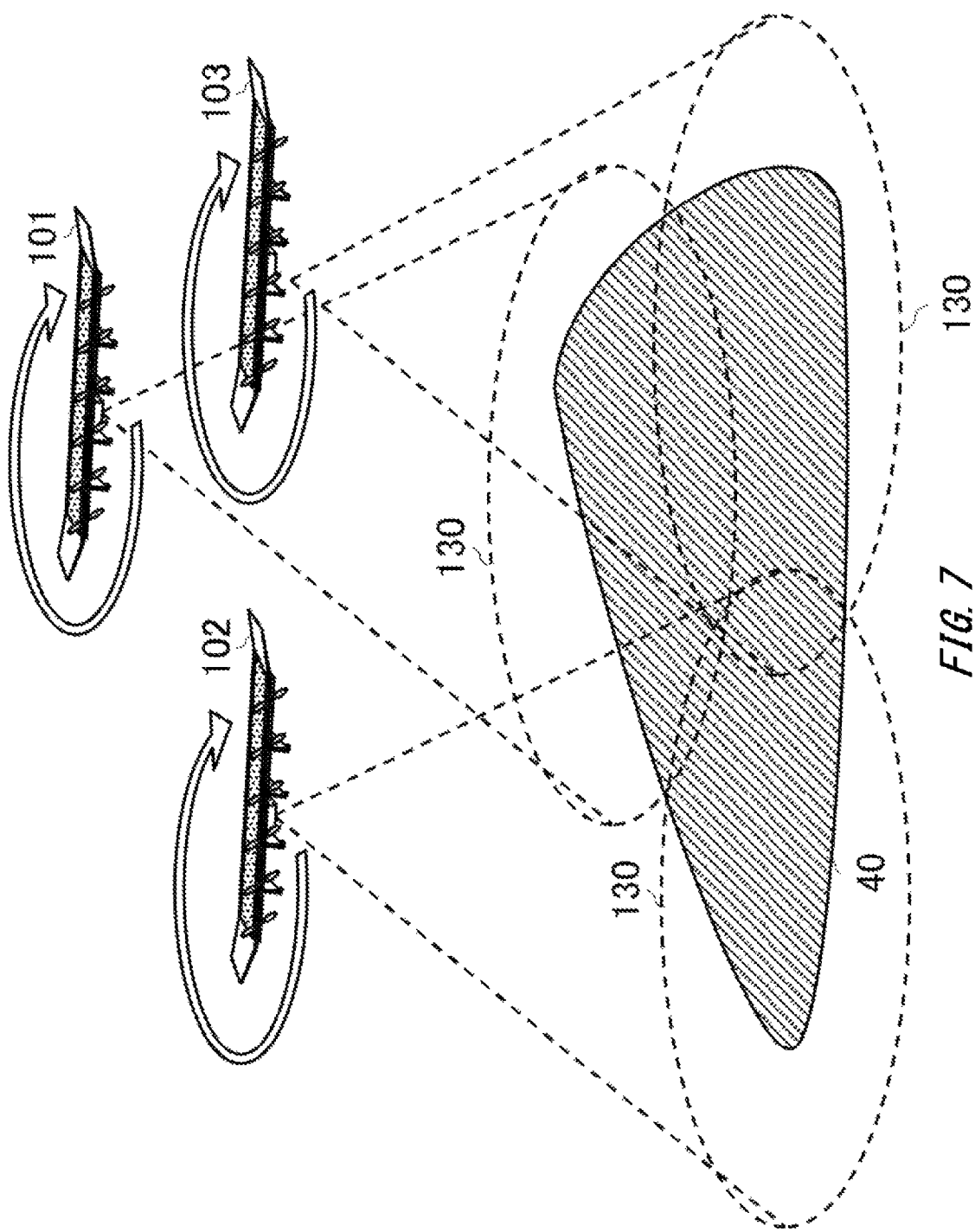
FIG. 7 schematically illustrates an example of formation flying of a plurality of aircrafts 100.

FIG. 7 schematically illustrates an example of the formation flying of the plurality of aircrafts 100. Here, the description will be given about a case where the aircraft 101, the aircraft 102, and the aircraft 103 fly at a fixed point in the sky of the target area 40 to cover a target area 40, in which the aircraft 101 is the remote operation target.

The aircraft 101 flies to cover a portion corresponding to itself in the target area 40 according to the remote operation signal received from the management device 300 or the remote operation device 400. The aircraft 102 and the aircraft 103 fly in tune with the aircraft 101. The aircraft 102 and the aircraft 103 fly to cover the portions corresponding to each one in the target area 40 in the same flying pattern as the aircraft 101 while communicating with the aircraft 101.

The management device 300 may monitor the states of the aircraft 101, the aircraft 102, and the aircraft 103. The management device 300 may receive state information indicating each state from each of the aircraft 101, the aircraft 102, and the aircraft 103 so as to monitor the states of the aircraft 101, the aircraft 102, and the aircraft 103.

In a case where any of the aircraft 102 and the aircraft 103 which are child aircrafts satisfies a preset condition, the management device 300 may, for example, switch the remote operation target from the aircraft 101 to the aircraft 102 or the aircraft 103 which satisfies the condition. As a preset condition, there may be set a defect or failure occurring in a part related to a flying function of the aircraft 100, and a defect or failure occurring in a part related to the communication function of the aircraft 100.

For example, in a case where one of the plurality of propellers 116 of the aircraft 102 fails, the management device 300 switches the remote operation target from the aircraft 101 to the aircraft 102. Thereby, the remote operator can be assigned to the aircraft 100 where a failure has occurred, and can operate the flying according to the failure.

After switching, the aircraft 101 and the aircraft 103 fly in tune with the aircraft 102. In this way, in a case where the parent aircraft is switched due to a failure, the management device 300 may change the tuning condition of the child aircraft before and after switching. For example, the tuning condition before switching includes following the speed of the parent aircraft, and the tuning condition after switching includes following the speed of the parent aircraft. As a result, in a case where the flying speed is lowered due to a failure of the part related to the flying function of the parent aircraft, it is possible to prevent from unnecessarily lowering the flying speed of the child aircraft even though the part related to the flying function has not failed.

Figure 8:
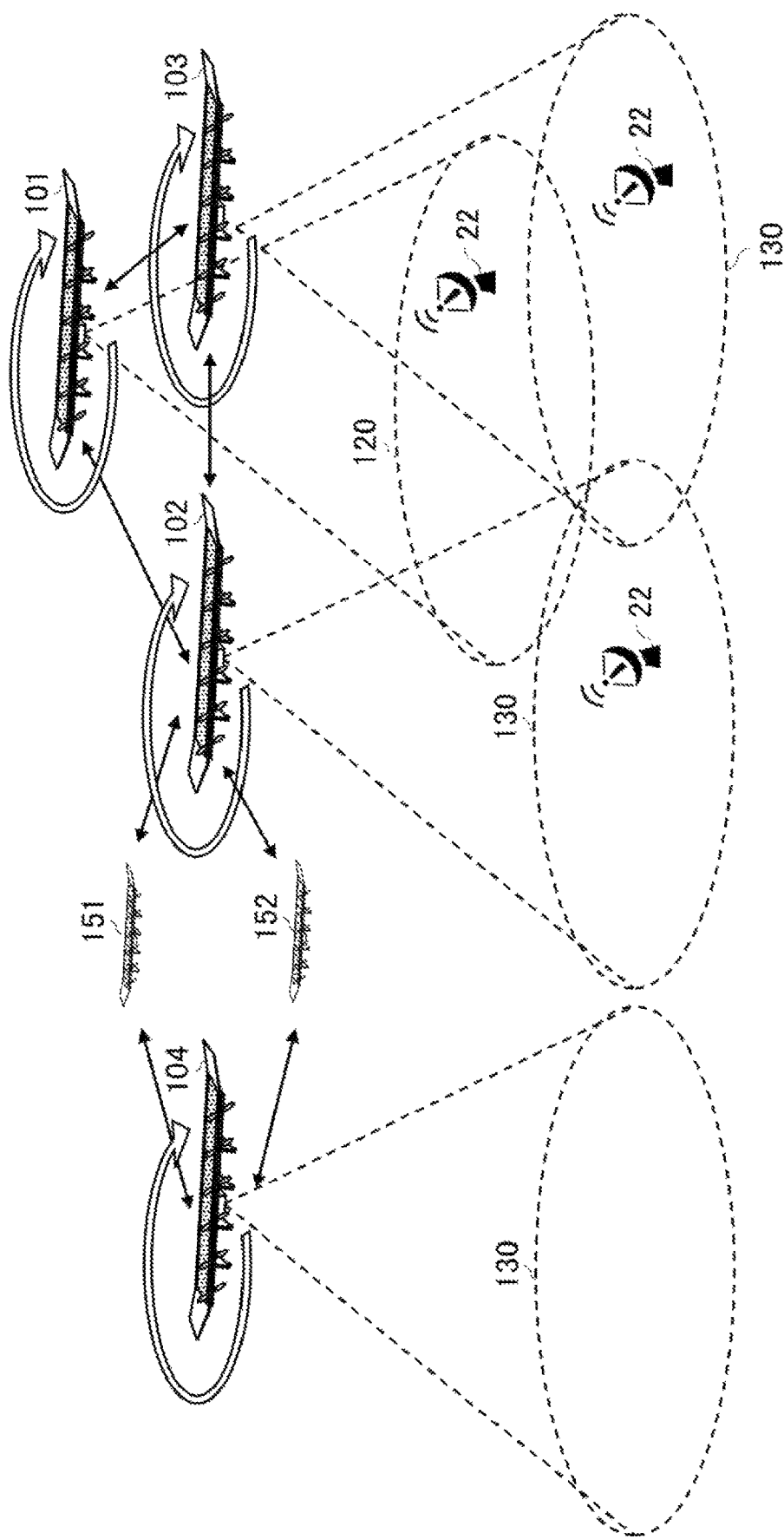
FIG. 8 schematically illustrates an example of formation flying of a plurality of aircrafts 100.

FIG. 8 schematically illustrates an example of the formation flying of the plurality of aircrafts 100. Here, the description will be given about an example of the communication method in the aircraft group in a case where, in the aircraft group including the aircraft 101, the aircraft 102, the aircraft 103, and the aircraft 104, the aircraft 104 is out of the range where a direct communication with the other aircraft is possible, and the gateway 22 does not exist in the communication area 130 of the aircraft 104.

FIG. 8 illustrates a case where the aircraft 102 in the aircraft 101, the aircraft 102, and the aircraft 103 is closest to the aircraft 104. The management device 300 may arrange at least any of an aircraft 151 and an aircraft 152 between the aircraft 102 and the aircraft 104. Then, at least any of the aircraft 151 and the aircraft 152 may relay the communication between the aircraft 102 and the aircraft 104.

The aircraft 151 and the aircraft 152 may have the same configuration as the aircraft 100. In addition, the aircraft 151 and the aircraft 152 may have less function than the aircraft 100. For example, the aircraft 151 and the aircraft 152 may not have a function of forming the communication area 130.

Figure 9:
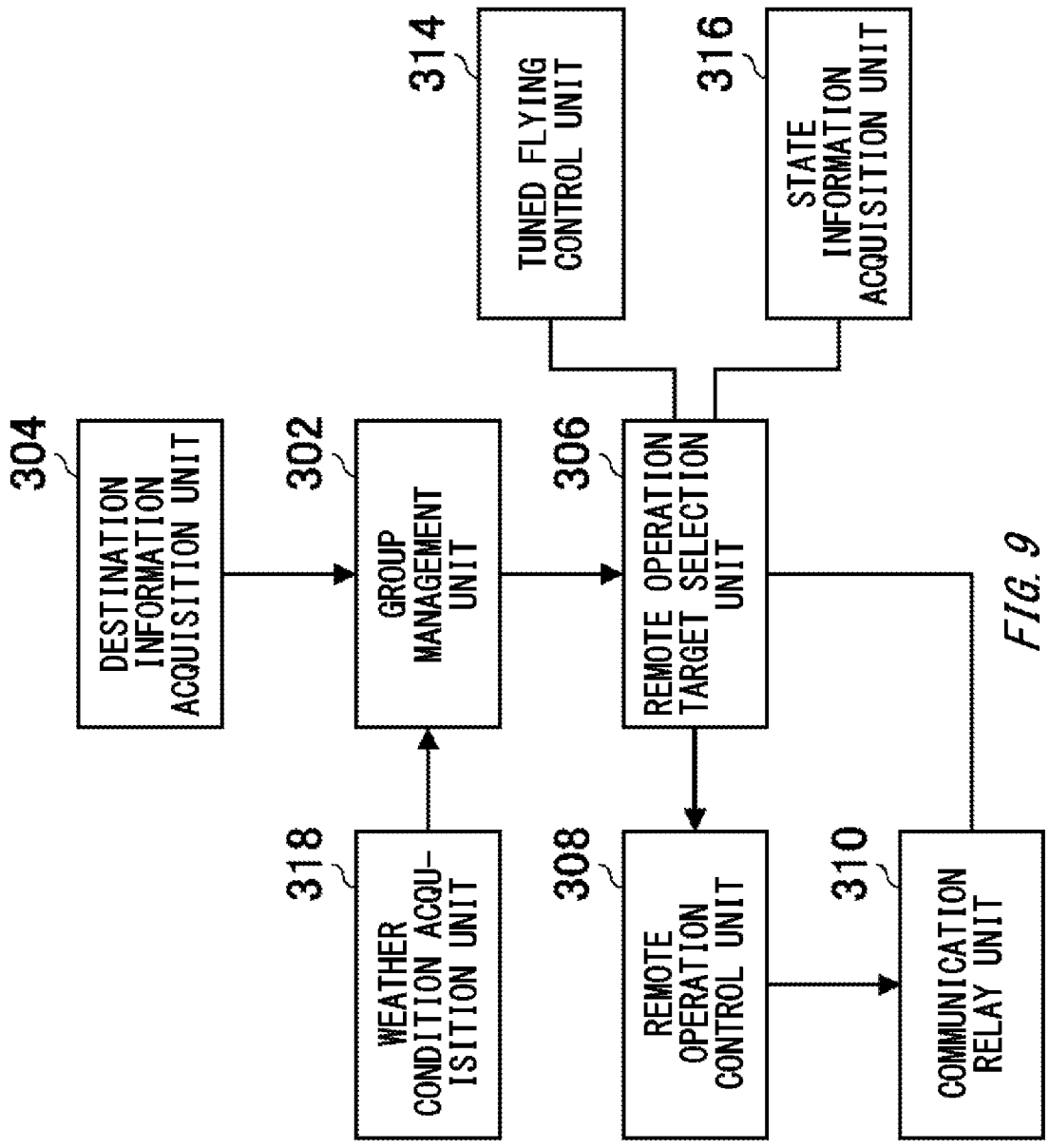
FIG. 9 schematically illustrates an example of the functional configuration of a management device 300.

FIG. 9 schematically illustrates an example of the functional configuration of the management device 300. The management device 300 includes a group management unit 302, a destination information acquisition unit 304, a remote operation target selection unit 306, a remote operation control unit 308, a communication relay unit 310, a tuned flying control unit 314, a state information acquisition unit 316, and a weather condition acquisition unit 318.

The group management unit 302 manages the aircraft group of the plurality of aircrafts 100. The grouping of the aircraft 100 may be determined by, for example, the operator of the management device 300, or may be autonomously determined by the management device 300.

The destination information acquisition unit 304 acquires the destination information indicating the destination of each of the plurality of aircrafts 100. The group management unit 302 may group the plurality of aircrafts 100 based on a plurality of pieces of destination information acquired by the destination information acquisition unit 304. For example, the group management unit 302 makes a group by grouping the aircrafts 100 having the same destination. In addition, for example, the group management unit 302 makes a group by defining a plurality of areas and grouping the aircrafts 100 having the destination located in the same area.

The remote operation target selection unit 306 selects the aircraft 100 of the remote operation target for each aircraft group which is managed by the group management unit 302. The remote operation target selection unit 306 selects, for example, the aircraft 100 specified by the operator of the management device 300 as the remote operation target. In addition, the remote operation target selection unit 306 may autonomously select the aircraft 100 of the remote operation target. For example, the management device 300 selects the aircraft 100 of the remote operation target according to the states of the plurality of aircrafts 100.

The remote operation control unit 308 controls the remote operation of the aircraft 100 selected as the remote operation target by the remote operation target selection unit 306. The remote operation control unit 308 associates the remote operation device 400 to each of the aircrafts 100 of the plurality of remote operation targets.

The communication relay unit 310 relays the communication between the aircraft 100 and the remote operation device 400 associated by the remote operation control unit 308. For example, the communication relay unit 310 receives a captured image transmitted by the aircraft 100, and transmits the captured image to the remote operation device 400. In addition, the communication relay unit 310 transmits the remote operation signal received from the remote operation device 400 to the aircraft 100. The communication relay unit 310 may be an example of a signal receiving unit. In addition, the communication relay unit 310 may be an example of a signal transmitting unit. Further, the communication relay unit 310 may establish the communication connection between the aircraft 100 and the remote operation device 400, and transmit the captured image and the remote operation signal between the aircraft 100 and the remote operation device 400 without going through the management device 300.

The tuned flying control unit 314 controls the tuned flying of the aircraft 100. The tuned flying control unit 314 controls the child aircraft, which is the aircraft 100 not selected as the parent aircraft, to fly in tune with the parent aircraft or the other child aircrafts for each of the plurality of aircraft groups. The tuned flying control unit 314 notifies, for example, the child aircraft of the parent aircraft or the other child aircrafts which are targets to fly in tune with. In addition, the tuned flying control unit 314 transmits a tuning condition (tuning algorithm) used in the tuned flying to the child aircraft. The tuning condition may specify a flying method according to a situation (takeoff and landing, traveling to the destination, and fixed point flying). In addition, the tuning condition may specify a distance relationship, a positional relationship, an altitude relationship, a speed relationship, and the like with a target flying in tune.

The state information acquisition unit 316 acquires the state information indicating the state of each of the plurality of aircrafts 100. The state information acquisition unit 316 receives, for example, the state information from each of the plurality of aircrafts 100. The state information acquisition unit 316 may acquire information detected by various sensors (wind speed sensor, temperature sensor, hygrometer sensor, illuminance sensor, and the like) installed in the aircraft 100 from the various sensors.

The remote operation target selection unit 306 may select the remote operation target or switch the remote operation target based on the state information acquired by the state information acquisition unit 316. For example, the remote operation target selection unit 306 switches the remote operation target from the parent aircraft to the child aircraft in a case where the state information of the child aircraft included in the aircraft group under the fixed point flying indicates that the state of the child aircraft is a bad state.

A case where the state information indicates that the state of the child aircraft is a bad state is, for example, a case where a failure occurs in the child aircraft. In addition, for example, there is a case where a defect occurs in the child aircraft. In addition, for example, there are cases such as a case where the battery level of the battery of the child aircraft is significantly low.

The tuned flying control unit 314 may cause the child aircraft after switching to execute the tuned flying on the parent aircraft in a tuning condition different from the tuning condition before switching in a case where the child aircraft is switched to the parent aircraft when the state information of the child aircraft indicates that the child aircraft is a bad state. For example, in a case where a first tuning condition before switching includes following the speed of the parent aircraft, a second tuning condition after switching may not include following the speed of the parent aircraft. The tuned flying control unit 314 may transmit the second tuning condition to the child aircraft in a case where the state information indicates that the state of the child aircraft is a bad state. In addition, the tuned flying control unit 314 may transmit the first tuning condition and the second tuning condition in advance to the aircraft 100, and make switching according to a situation.

The weather condition acquisition unit 318 acquires the weather condition of the flying area where the plurality of aircrafts 100 is flying. The weather condition acquisition unit 318 acquires, for example, the weather condition of the flying area where each of the plurality of aircraft groups is flying. The weather condition acquisition unit 318 may receive weather condition information indicating the weather condition of each area from the weather information server 500.

The weather condition acquisition unit 318 acquires, for example, the weather condition of the flying area where each of a first aircraft group and a second aircraft group, each of which has the flying area within a preset distance, is flying. The weather condition acquisition unit 318 may acquire a first weather condition of a first flying area where the first aircraft group is flying, and a second weather condition of a second flying area where the second aircraft group is flying. Here, in a case where the first weather condition and the second weather information satisfy a preset condition, the tuned flying control unit 314 may control the child aircraft included in the first aircraft group to fly in tune with the parent aircraft of the second aircraft group. In this case, the group management unit 302 may move the child aircraft included in the first group to the second aircraft group.

For example, the tuned flying control unit 314 causes the child aircraft flying in a part of the first flying area to fly in tune with the parent aircraft of the second flying group in a case where the same weather condition in the first flying area and the same weather condition in the second flying area change so that a part of the weather condition of the first flying area becomes the same as the weather condition in the second flying area. As a result, even in a case where the weather has changed, the aircrafts located in the same weather condition can be included in the same aircraft group. Thus, even in a case where the weather has changed, the child aircraft can be made fly in tune with the parent aircraft located within the same weather condition as the child aircraft.

The remote operation target selection unit 306 and the tuned flying control unit 314 may perform various controls by combining the information acquired by the state information acquisition unit 316 and the weather condition acquired by the weather condition acquisition unit 318. For example, the remote operation target selection unit 306 and the tuned flying control unit 314 perform basic control based on the weather condition acquired by the weather condition acquisition unit 318, and perform detailed control based on the measured values in real time (information acquired by a condition information acquisition unit 316 from various sensors). For example, as described above, the tuned flying control unit 314 determines whether the weather conditions are the same based on the measured values acquired by the state information acquisition unit 316 in a case where the same weather condition in the first flying area and the same weather condition in the second flying area change so that a part of the weather condition of the first flying area becomes the same weather condition in the second flying area based on the weather condition acquired by the weather condition acquisition unit 318, and in a case where the child aircraft flying in a part of the first flying area is controlled to fly in tune with the parent aircraft of the second flying group. For example, even in a case where it is determined that the weather conditions are the same based on the weather condition acquired by the weather condition acquisition unit 318, the weather conditions cannot be determined as the same depending on the measured values acquired by the state information acquisition unit 316. In this case, the tuned flying control unit 314 determines that the weather conditions are not the same as a result.

The remote operation target selection unit 306 and the tuned flying control unit 314 may change a weight of data to be used for control according to the magnitude of the difference between the weather condition acquired by the weather condition acquisition unit 318 and the measured value acquired by the state information acquisition unit 316. In addition, machine learning (AI deep learning) may be performed by accumulating data (building up teacher data). For example, the data of the weather condition and the measured value is accumulated to derive a correlation between the magnitude of the differenced and all other various conditions such as area, time zone, weather condition source, and flying pattern, so that the improvement in accuracy and efficiency in prediction control, feedback control, and real time control may be achieved. In this way, it can be achieved that the weather condition of the area where the aircraft 100 flies is more accurately grasped and used for control by using the weather condition acquired by the weather condition acquisition unit 318 and the measured value acquired by the state information acquisition unit 316.

Figure 10:
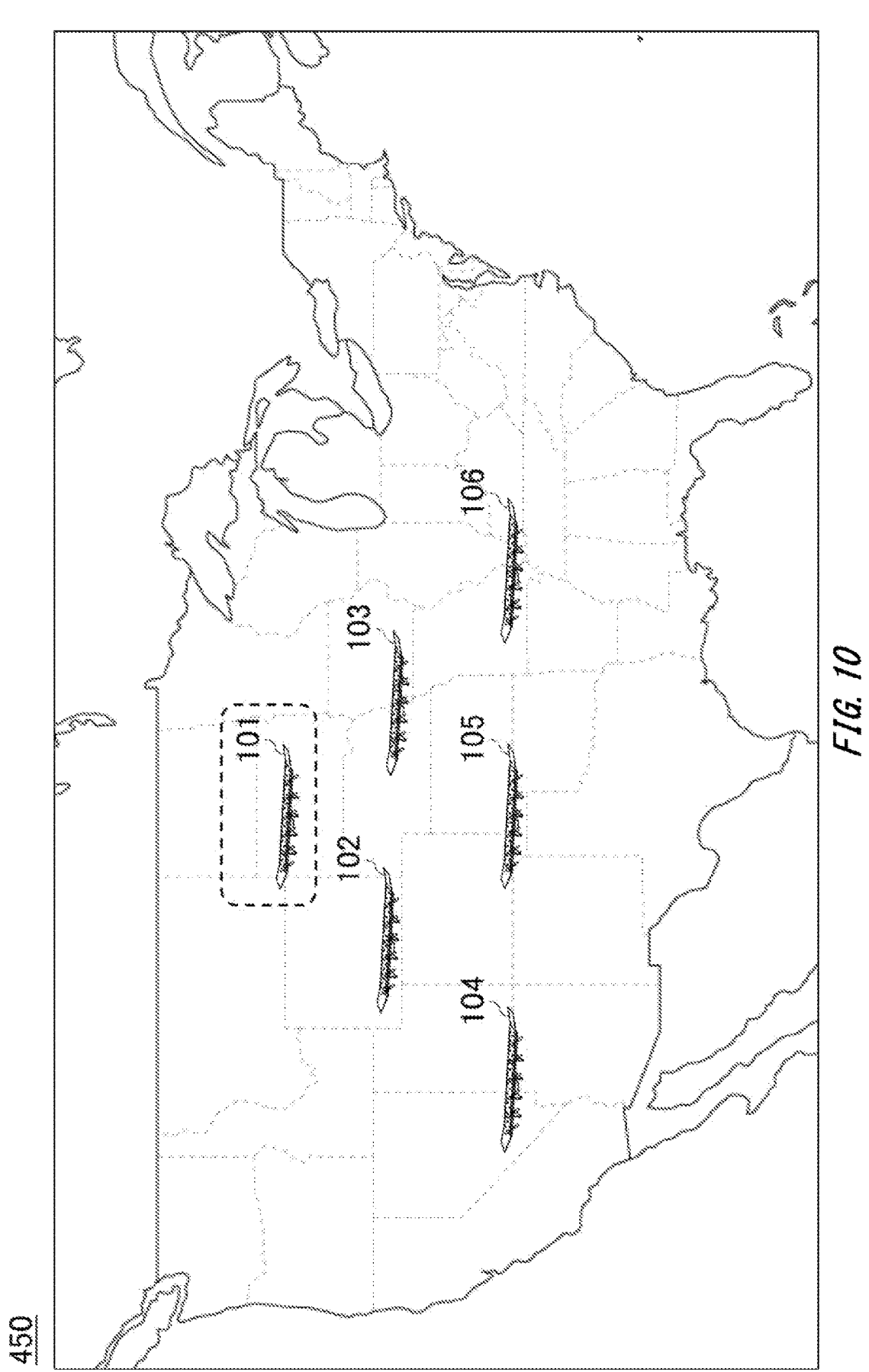
FIG. 10 schematically illustrates a display example 500 of the remote operation device 400.

FIG. 10 schematically illustrates a display example 450 of the remote operation device 400. The remote operation device 400 may display the position of the aircraft 100 of the remote operation target and the position of the aircraft 100 included in the same aircraft group as the aircraft 100 as a bird's-eye view. FIG. 10 illustrates a bird's-eye view displaying the positions of the aircraft 101 which is the parent aircraft and the aircraft 102, the aircraft 103, the aircraft 104, the aircraft 105, and the aircraft 106 which are the child aircrafts.

In addition, the remote operation device 400 may display an aircraft view displaying the captured image by the aircraft 100. The remote operation device 400 may display the captured image of the parent aircraft. In addition, the remote operation device 400 may display the captured image of the child aircraft. The captured image of the parent aircraft and the captured image of the child aircraft may be switched in displaying, or may be displayed in parallel.

The remote operation device 400 may switch the bird's-eye view and the aircraft view in displaying. In addition, for example, the remote operation device 400 may display the aircraft view to be included in the bird's-eye view. The remote operation device 400 may arrange and display the captured image of each of the plurality of aircrafts 100 at a position corresponding to the position of each of the plurality of aircrafts 100 in the bird's-eye view.

Figure 11:
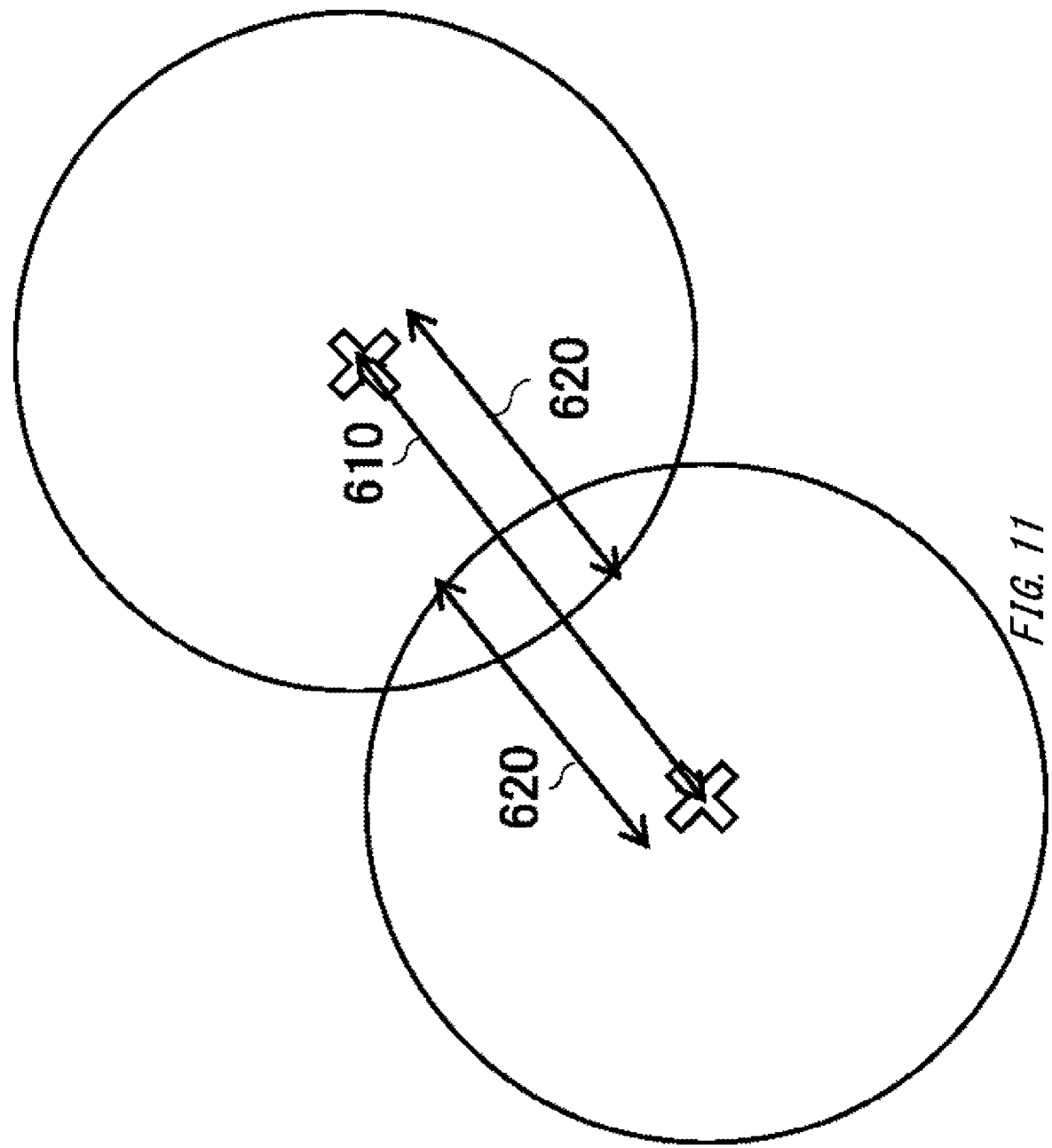
FIG. 11 is an explanatory diagram for explaining an algorithm for maintaining intervals between the aircrafts 100.

FIG. 11 is an explanatory diagram for explaining an algorithm for maintaining the interval between two aircrafts 100. The parent aircraft and the child aircraft, or the child aircrafts may perform control to maintain the distance between aircrafts by sharing latitude, longitude, and altitude by communicating with each other. For example, the child aircraft may fly so that the distance from the parent aircraft is not shorter than a preset distance.

The child aircraft grasps the center coordinates (latitude, longitude, altitude) of its own aircraft and the parent aircraft, a distance change direction and speed of its own aircraft and the parent aircraft, and the distance between target aircrafts to be maintained, and controls the operation of its own aircraft based on a distance 610 between the own aircraft and the parent aircraft and a radius 620 which is a radius of the distance between target aircrafts to be maintained. As a specific example, the child aircraft controls the own operation such that the square of the distance 610 remains greater than the square sum of the radius 620. In addition, for example, the child aircraft controls the own operation such that the distance 610 is greater than the sum of the radius 620. The child aircraft may control the operation to satisfy Distance 610=Radius 620 according to the distance change direction and the speed. Further, the settings such as the distance between aircrafts may be performed in the management device 300.

Figure 12:
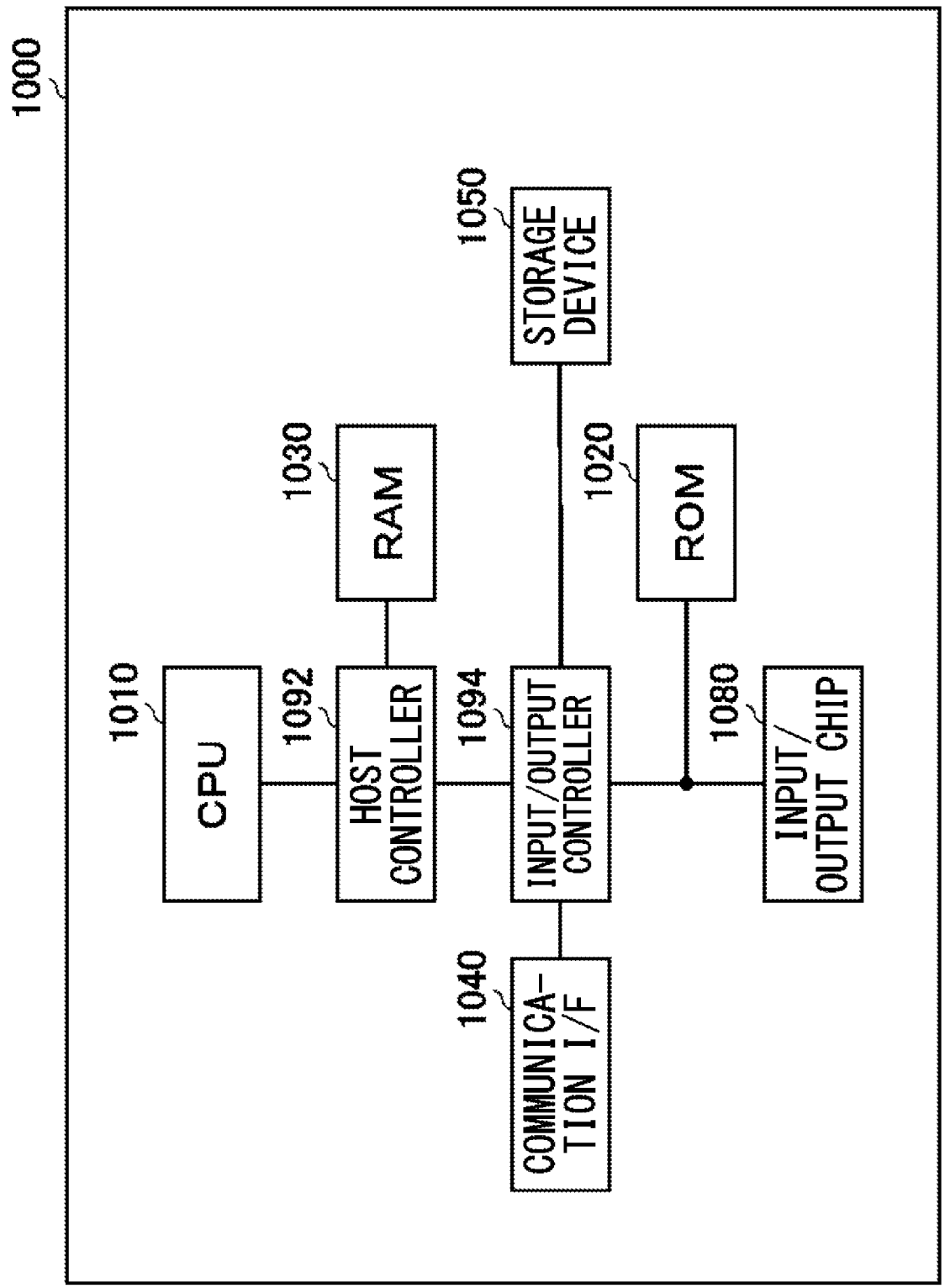
FIG. 12 schematically illustrates an example of the hardware configuration of a computer 1000 which functions as the management device 300.

FIG. 12 schematically illustrates an example of a computer 1000 which functions as the management device 300. The computer 1000 according to this embodiment includes CPU peripheral parts which include a CPU 1010 and a RAM 1030 which are connected to each other by a host controller 1092, and an input/output unit which includes a ROM 1020, a communication I/F 1040, a storage device 1050, and an input/output chip 1080 which are connected to the host controller 1092 by an input/output controller 1094.

The CPU 1010 operates based on a program stored in the ROM 1020 and the RAM 1030, and controls the parts. The communication I/F 1040 communicates with other devices via a network. In addition, the communication I/F 1040 functions as hardware for communication. The storage device 1050 may be a hard disk drive, a solid state disk, and a solid state drive, and stores a program and data used by the CPU 1010.

The ROM 1020 stores a boot program executed when the computer 1000 starts up and a program depending on the hardware of the computer 1000. The input/output chip 1080 connects, for example, various input/output devices to the input/output controller 1094 via a USB port, a parallel port, a serial port, a keyboard port, a mouse port, and the like.

The program provided to the storage device 1050 via the RAM 1030 is stored in a recording medium such as an IC card and supplied by a user. The program is read out from the recording medium, installed in the storage device 1050 via the RAM 1030, and executed in the CPU 1010.

The program, which is installed in the computer 1000 and makes the computer 1000 function as the management device 300, may work on the CPU 1010 and the like to make the computer 1000 function as the parts of the management device 300. Information processing described in these programs is read to the computer 1000 so as to function as the group management unit 302, the destination information acquisition unit 304, the remote operation target selection unit 306, the remote operation control unit 308, the communication relay unit 310, the tuned flying control unit 314, the state information acquisition unit 316, and the weather condition acquisition unit 318 which are specific examples in cooperation with software and the various hardware resources. Then, with these specific examples, the information is calculated or modified according to an application of the computer 1000 in this embodiment. Therefore, a management device 300 is constructed according to the application.

While the embodiments of the present invention have been described, the technical scope of the invention is not limited to the above described embodiments. It is apparent to persons skilled in the art that various alterations and improvements can be added to the above-described embodiments. It is apparent from the description of the appended claims that embodiments with such changes or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described using phrases such as "first" or "next" in the claims, embodiments, or diagrams, it does not necessarily mean that the process must be performed in this order.

EXPLANATION OF REFERENCES 20 network
22 gateway
30 user terminal
40 target area
100, 101, 102, 103, 104, 105, 106 aircraft
114 main wing part
116 propeller
118 skid
120 wheel
122 solar cell panel
130 communication area
132 cell
151 aircraft
152 aircraft
200 control device
210 communication unit
212 ground communication unit
214 aerial communication unit
220 captured image acquisition unit
222 captured image transmission unit
230 remote operation flying execution unit
240 tuned flying execution unit
300 management device
302 group management unit
304 destination information acquisition unit
306 remote operation target selection unit
308 remote operation control unit
310 communication relay unit
314 tuned flying control unit
316 state information acquisition unit
318 weather condition acquisition unit
400 remote operation device
410 cockpit
420 operation unit
430 communication unit
440 display unit
450 display example
500 weather information server
610 distance
620 radius
1000 computer
1010 CPU
1020 ROM
1030 RAM
1040 communication I/F
1050 storage device
1080 input/output chip
1092 host controller
1094 input/output controller

What is claimed is:

1. A system, comprising:
a plurality of aircrafts, each of which has an antenna for forming a communication area on a ground to provide a radio communication service to a user terminal in the communication area; and
a management device that manages the plurality of aircrafts, the management device being configured and adapted to
select an aircraft of the remote operation target from the plurality of aircraft,
transmit a remote operation signal to an aircraft selected as a remote operation target from the plurality of aircrafts, and
acquire state information indicating a state of each of the plurality of aircrafts from each of the plurality of aircrafts, and
wherein each of the plurality of aircrafts is configured and adapted to
cause the aircraft to fly based on the remote operation signal received from the management device when the aircraft is selected as the remote operation target, and
cause the aircraft to fly in tune with other aircraft selected as the remote operation target when the aircraft is not selected as the remote operation target,
cause the aircraft to fly in a flying pattern corresponding to a flying pattern of the other aircraft on the sky of a covering target area of the aircraft so as to cover the covering target area of the aircraft when other aircraft selected as the remote operation target is circling in the sky over a covering target area of the other aircraft based on the remote operation signal, and
when a parent aircraft, which is an aircraft selected as the remote operation target among the plurality of aircrafts, flies based on the remote operation signal, and child aircrafts, which are aircrafts other than the parent aircraft, fly in tune with the parent aircraft, switch the remote operation target from the parent aircraft to a child aircraft in response to the state information of the child aircraft indicating that the state of the child aircraft is a bad state.

2. The system according to claim 1, wherein, when the child aircraft flies in tune with the parent aircraft according to a first tuning condition, the state information of the child aircraft indicates that the state of the child aircraft is the bad state, and thus in a case where the remote operation target switches from the parent aircraft to the child aircraft, and the child aircraft after switching flies in tune with the parent aircraft after switching according to a second tuning condition different from the first tuning condition.

3. The system according to claim 2,
wherein the first tuning condition includes following a speed of the parent aircraft, and the second tuning condition does not include following the speed of the parent aircraft.

4. The system according to claim 1, wherein
when the aircraft is caused to fly in tune with other aircraft, the plurality of aircraft are further configured and adapted to cause the aircraft to fly based on a control signal received from the other aircraft selected as the remote operation target.

5. The system according to claim 2, wherein
when the aircraft is caused to fly in tune with other aircraft, the plurality of aircraft are further configured and adapted to cause the aircraft to fly based on a control signal received from the other aircraft selected as the remote operation target.

6. The system according to claim 3, wherein
when the aircraft is caused to fly in tune with other aircraft, the plurality of aircraft are further configured and adapted to cause the aircraft to fly based on a control signal received from the other aircraft selected as the remote operation target.

7. The system according to claim 4, wherein
the control signal instructs a flying pattern in which the other aircraft has flown based on the remote operation signal, and
when the aircraft is caused to fly in tune with other aircraft, the plurality of aircraft are further configured and adapted to cause the aircraft to fly based on the flying pattern.

8. The system according to claim 1, wherein
when the aircraft is caused to fly in tune with other aircraft, the plurality of aircraft are further configured and adapted to cause the aircraft to follow the other aircraft selected as the remote operation target.

9. The system according to claim 2, wherein
when the aircraft is caused to fly in tune with other aircraft, the plurality of aircraft are further configured and adapted to cause the aircraft to follow the other aircraft selected as the remote operation target.

10. The system according to claim 3, wherein
when the aircraft is caused to fly in tune with other aircraft, the plurality of aircraft are further configured and adapted to cause the aircraft to follow the other aircraft selected as the remote operation target.

11. The system according to claim 8, wherein
when the aircraft is caused to fly in tune with other aircraft, the plurality of aircraft are further configured and adapted to cause the aircraft to fly such that a distance to the other aircraft selected as the remote operation target does not become shorter than a preset distance.

12. The system according to claim 1, wherein
the management device includes a signal receiving unit that receives the remote operation signal from a remote operation device, and
wherein the signal transmitting unit transmits the remote operation signal received by the signal receiving unit to the aircraft selected as the remote operation target.

13. The system according to claim 2, wherein the management device is further configured and adapted to
receive the remote operation signal from a remote operation device, and
transmit the remote operation signal to the aircraft selected as the remote operation target.

14. The system according to claim 3, wherein the management device is further configured and adapted to
receive the remote operation signal from a remote operation device, and
transmit the remote operation signal to the aircraft selected as the remote operation target.

15. The system according to claim 1, wherein the management device is further configured and adapted to
acquire a first weather condition of a flying area where a first aircraft group, including a first parent aircraft which is an aircraft selected as the remote operation target and a first child aircraft which is an aircraft flying in tune with the first parent aircraft, flies, and a second weather condition of a flying area where a second aircraft group, including a second parent aircraft and a second child aircraft, flies, and
cause the first child aircraft to fly in tune with the second parent aircraft in a case where the first weather condition and the second weather condition satisfy a preset condition.

16. The system according to claim 2, wherein the management device is further configured and adapted to
acquire a first weather condition of a flying area where a first aircraft group, including a first parent aircraft which is an aircraft selected as the remote operation target and a first child aircraft which is an aircraft flying in tune with the first parent aircraft, flies, and a second weather condition of a flying area where a second aircraft group, including a second parent aircraft and a second child aircraft, flies, and
cause the first child aircraft to fly in tune with the second parent aircraft in a case where the first weather condition and the second weather condition satisfy a preset condition.

17. The system according to claim 3, wherein the management device is further configured and adapted to
acquire a first weather condition of a flying area where a first aircraft group, including a first parent aircraft which is an aircraft selected as the remote operation target and a first child aircraft which is an aircraft flying in tune with the first parent aircraft, flies, and a second weather condition of a flying area where a second aircraft group, including a second parent aircraft and a second child aircraft, flies, and
cause the first child aircraft to fly in tune with the second parent aircraft in a case where the first weather condition and the second weather condition satisfy a preset condition.

18. A management device for managing a plurality of aircrafts, each of which has an antenna for forming a communication area on a ground to provide a radio communication service to a user terminal in the communication area, the management device being configured and adapted to:
select an aircraft of a remote operation target from the plurality of aircrafts;
transmit a remote operation signal to the aircraft selected as the remote operation target from the plurality of aircrafts;
cause an aircraft not selected as the remote operation target from the plurality of aircrafts to fly in tune with the aircraft selected as the remote operation target;
acquire state information indicating a state of each of the plurality of aircrafts from each of the plurality of aircrafts; and
when a parent aircraft, which is an aircraft selected as the remote operation target among the plurality of aircrafts, flies circling in a sky of a covering target area of the parent aircraft based on the remote operation signal, and child aircrafts, which are aircrafts other than the parent aircraft, fly in tune with the parent aircraft in a predetermined flying pattern in tune with the parent aircraft in the sky of a covering target area of the child aircrafts to cover the covering target area of the child aircrafts, switch the remote operation target from the parent aircraft to a child aircraft in response to the state information of the child aircraft indicating that the state of the child aircraft is in a bad state.

* * * * *